(12) United States Patent
Rajagopalan et al.

(10) Patent No.: US 10,148,509 B2
(45) Date of Patent: Dec. 4, 2018

(54) METHODS, SYSTEMS, AND COMPUTER READABLE MEDIA FOR SESSION BASED SOFTWARE DEFINED NETWORKING (SDN) MANAGEMENT

(71) Applicant: Oracle International Corporation, Redwood Shores, CA (US)

(72) Inventors: Sundaram Rajagopalan, Waltham, MA (US); Apirux Bantukul, Cary, NC (US); Xunyi Fan, Nanjing (CN); Haijie Wang, Nanjing (CN); Ben Zhang, Nanjing (CN)

(73) Assignee: Oracle International Corporation, Redwood Shores, CA (US)

( * ) Notice: Subject to any disclaimer, the term of this patent is extended or adjusted under 35 U.S.C. 154(b) by 9 days.

(21) Appl. No.: 14/711,761

(22) Filed: May 13, 2015

(65) Prior Publication Data

US 2016/0337896 A1  Nov. 17, 2016

(51) Int. Cl.
*H04L 12/24* (2006.01)
*H04L 12/26* (2006.01)

(52) U.S. Cl.
CPC ...... *H04L 41/0893* (2013.01); *H04L 43/0829* (2013.01); *H04L 43/0852* (2013.01); *H04L 43/0894* (2013.01)

(58) Field of Classification Search
CPC ........................................... H04L 47/20
See application file for complete search history.

(56) References Cited

U.S. PATENT DOCUMENTS

| 8,665,717 | B2 | 3/2014 | Kotecha et al. |
| 9,398,492 | B2 | 7/2016 | Deo |
| 9,537,904 | B2 | 1/2017 | Bantukul |
| (Continued) | | | |

FOREIGN PATENT DOCUMENTS

| CN | 19372623 A | 3/2007 |
| CN | 101001401 A | 7/2007 |
| (Continued) | | |

OTHER PUBLICATIONS

3GPP Technical Specification TS23.203 version 12.6.0 Release 12.*

(Continued)

*Primary Examiner* — Jeffrey M Rutkowski
*Assistant Examiner* — Basil Ma
(74) *Attorney, Agent, or Firm* — Jenkins, Wilson, Taylor & Hunt, P.A.

(57) ABSTRACT

Methods, systems, and computer readable media for session based software defined networking (SDN) management are disclosed. According to one method, the method occurs at a policy engine. The method includes determining, using a session identifier, Third Generation Partnership Project (3GPP) session information associated with a user device. The method also includes generating, using the 3GPP session information, SDN policy information for SDN related traffic associated with the 3GPP session, wherein the SDN policy information is for providing a quality of service (QoS) for the SDN related traffic corresponding to a QoS associated with the 3GPP session information, wherein the SDN related traffic is correlated with the 3GPP session using a source address associated with the user device.

19 Claims, 7 Drawing Sheets

(56) References Cited

U.S. PATENT DOCUMENTS

| | | | |
|---|---|---|---|
| 2009/0316656 A1* | 12/2009 | Zhao | H04W 28/22 370/331 |
| 2010/0080172 A1 | 4/2010 | Jin et al. | |
| 2010/0103861 A1 | 4/2010 | Ulupinar et al. | |
| 2011/0131332 A1 | 6/2011 | Bouazizi | |
| 2012/0123870 A1 | 5/2012 | Denman et al. | |
| 2012/0140665 A1 | 6/2012 | Li et al. | |
| 2012/0300615 A1 | 11/2012 | Kempf et al. | |
| 2012/0303835 A1 | 11/2012 | Kempf et al. | |
| 2013/0044645 A1 | 2/2013 | Castro Castro et al. | |
| 2013/0086279 A1 | 4/2013 | Archer et al. | |
| 2013/0343295 A1 | 12/2013 | Deo | |
| 2014/0059678 A1 | 2/2014 | Parker | |
| 2014/0105039 A1 | 4/2014 | McDysan | |
| 2014/0189137 A1 | 7/2014 | Castro Castro et al. | |
| 2014/0204796 A1 | 7/2014 | Bantukul | |
| 2014/0241247 A1* | 8/2014 | Kempf | H04L 12/4633 370/328 |
| 2014/0348068 A1 | 11/2014 | Morper et al. | |
| 2015/0071053 A1* | 3/2015 | Kempf | H04W 24/02 370/216 |
| 2016/0262044 A1* | 9/2016 | Calin | H04W 28/0268 |
| 2016/0277294 A1* | 9/2016 | Akiyoshi | H04W 40/02 |

FOREIGN PATENT DOCUMENTS

| | | |
|---|---|---|
| CN | 101127609 A | 2/2008 |
| CN | 201380031363.5 | 7/2018 |
| EP | 2 949 098 B1 | 10/2017 |
| JP | 2003-174483 A | 6/2003 |
| JP | 2013-098597 A | 5/2013 |
| JP | 6163204 B2 | 7/2017 |
| KR | 10-2009-0033968 | 4/2009 |
| KR | 10-2012-0055955 | 6/2012 |
| KR | 10-2012-0059542 | 6/2012 |
| WO | WO 2010/066295 A1 | 6/2010 |
| WO | WO 2011/063853 A1 | 6/2011 |
| WO | WO 2011/127974 A1 | 10/2011 |
| WO | WO 2012/003764 A1 | 1/2012 |
| WO | WO 2012/039176 A1 | 3/2012 |
| WO | WO 2012/055446 A1 | 5/2012 |
| WO | WO 2012/063106 A1 | 5/2012 |
| WO | WO 2012/144194 A1 | 10/2012 |
| WO | WO 2012/149954 A1 | 11/2012 |
| WO | WO 2012/160465 A1 | 11/2012 |
| WO | WO 2013/188665 A1 | 12/2013 |

OTHER PUBLICATIONS

3GPP Technical Specification TS23.401 version 12.6.0 Release 12.*
Final Office Action for U.S. Appl. No. 13/749,655 dated (May 25, 2016).
Applicant-Initiated Interview Summary for U.S. Appl. No. 13/749,655 dated (Mar. 31, 2016).
Notice of Allowance and Fee(s) Due for U.S. Appl. No. 13/917,200 dated (Mar. 28, 2016).
Extended European Search Report for European Application No. 13804779.0 dated (Jan. 19, 2016).
Advisory Action Before the Filing of an Appeal Brief and AFCP 2.0 Decision for U.S. Appl. No. 13/917,200 dated (Jan. 14, 2016).
Non-Final Office Action for U.S. Appl. No. 13/749,655 dated (Dec. 31, 2015).
Communication of European Publication Number and Information on the Application of Article 67(3) EPC for European Patent Application No. 14703974.7 dated (Nov. 4, 2015).
Final Office Action for U.S. Appl. No. 13/917,200 dated (Oct. 22, 2015).
Applicant-Initiated Interview Summary for U.S. Appl. No. 13/917,200 dated (Jul. 27, 2015).
Advisory Action Before the Filing of an Appeal Brief, Examiner-Initiated Interview Summary and AFCP 2.0 Decision for U.S. Appl. No. 13/749,655 dated (Jul. 24, 2015).
Amendment for U.S. Appl. No. 13/749,655 dated (Jul. 6, 2015).
Final Office Action for U.S. Appl. No. 13/749,655 dated (Apr. 3, 2015).
Communication of European Publication Number and Information on the Application of Article 67(3) EPC for European Application No. 13804779.0 dated (Mar. 25, 2015).
Non-Final Office Action for U.S. Appl. No. 13/917,200 dated (Mar. 16, 2015).
Non-Final Office Action for U.S. Appl. No. 13/749,655 dated (Sep. 3, 2014).
Notification of Transmittal of the International Search Report and the Written Opinion of the International Searching Authority, or the Declaration for International Application No. PCT/US2014/011551 dated (Apr. 28, 2014).
Commonly-assigned, co-pending International Application No. PCT/US14/11551 for "Methods, Systems, and Computer Readable Media for Using Policy Knowledge of or Obtained by a Policy and Charging Rules Function (PCRF) for Needs Based Forwarding of Bearer Session Traffic to Network Nodes," (Unpublished, filed Jan. 14, 2014).
Notification of Transmittal of the International Search Report and the Written Opinion of the International Searching Authority, or the Declaration for International Application No. PCT/US2013/045652 dated (Sep. 17, 2013).
"LTE QoS: SDF and EPS Bearer Qos," Netmanias, http://www.netmanias.com/en/post/techdocs/5908/eps-lte-qos-sdf/lte-qos-sdf-and-eps-bearer-qos, pp. 1-17 (Sep. 11, 2013, downloaded Apr. 8, 2015).
Kempf et al., "Moving the Mobile Evolved Packet Core to the Cloud," 2012 Fifth International Workshop on Selected Topics in Mobile and Wireless Computing, pp. 1-8 (Oct. 8, 2012).
Li Erran et al., "CellSDN: Software-Defined Cellular Networks," ftp://ftp.cs.princeton.edu/techeports/2012/922.pdf, pp. 1-6 (Apr. 20, 2012).
"OpenFlow Switch Specification," Version 1.1.0 Implemented (Wire Protocol 0x02), www.openflow.org, pp. 1-56 (Feb. 28, 2011).
3rd Generation Partnership Project, "Technical Specification Group Services and System Aspects; Policy and charging control architecture (Release 9)," 3GPP TS 23.203 V9.3.0 (Dec. 2009).
"Introduction to Evolved Packet Core," White Paper, Alcatel-Lucent, 11 pgs. (2009).
Non-Final Office Action for U.S. Appl. No. 14/086,950 dated (Jan. 3, 2017).
Communiction pursuant to Article 94(3) EPC for European Patent Application No. 14 703 974.7 dated (Dec. 21, 2016).
Letter regarding Japanese Office Action for Japanese Patent Application No. 2015-55185 dated (Dec. 20, 2016).
Letter regarding Japanese Office Action for Japanese Patent Application No. 2015-517426 dated (Dec. 6, 2016).
Advisory Action Before the Filing of an Appeal Brief for U.S. Appl. No. 14/086,950 dated (Sep. 9, 2016).
Communication of European publication number and information on the application of Article 67(3) EPC for European Application No. 14812837.4 dated (Sep. 7, 2016).
Letter Regarding Office Action for Japanese Patent Application No. 2015-558193 dated (Aug. 30, 2016).
Letter Regarding Office Action for Japanese Patent Application No. 2015-555185 dated (Aug. 23, 2016).
Notice of Allowance and Fee(s) Due, Applicant-Initiated Interview Summary, and AFCP 2.0 Decision for U.S. Appl. No. 13/749,655 dated (Aug. 22, 2016).
Hayashi et al., "Research and Development for Supporting a Generic Technology of a Cloud in the Future," NEC Technical Report, vol. 63, No. 2, NEC Corporation, p. 124-128 (Apr. 23, 2010).
First Office Action for Chinese Patent Application No. 201480013195.1 dated (Jul. 5, 2017).
Letter Regarding Final Rejection for Japanese Patent Application No. 2015-555185 dated (Jun. 14, 2017).
Letter Regarding Notice of Grant for Japanese Patent Application No. 2015-517426 dated (May 30, 2017).

(56) References Cited

OTHER PUBLICATIONS

Communication under Rule 71(3) EPC Intention to grant for European Patent Application No. 14.703 974.7 dated (May 19, 2017).
Notification of the First Office Action for Chinese Patent Application No. 201380031363.5 dated (May 3, 2017).
Letter regarding Final Decision for Rejection for Japanese Patent Application No. 2015/555185 dated (Feb. 14, 2017).
Notification of the Second Office Action for Chinese Patent Application No. 201480013195.1 dated (Mar. 12, 2018).
Notification of the Second Office Action for Chinese Application No. 201380031363.5 dated (Dec. 25, 2017).
Decision to grant a European patent pursuant to Article 97(1) EPC for European Patent Application No. 14703974.7 dated (Sep. 14, 2017).
"3rd Generation Partnership Project; Technical Specification Group Services and System Aspects; Policy and Charging Control Architecture (Release 11)", 3GPP TS 23.203, V11.1.0, pp. 1-136, (Mar. 2011).
Letter Regarding Notification to Grant for Chinese Patent Application Serial No. ZL201380031363.5 dated (May 14, 2018).
Letter Regarding Notification to Grant for Chinese Patent Application Serial No. ZL201480013195.1 Jul. 2, 2018.

\* cited by examiner

| DIAMETER/ IP-CAN SESSION ID | RELATED IDENTIFIERS | POLICY/ CHARGING INFORMATION | NETWORK CONTROL INFORMATION |
|---|---|---|---|
| SESSION-ID_1 | SOURCE ADDRESS | PCC_RULE_1 PCC_RULE_6 QCI = 3 | SWITCHING_RULE_1 @ PORT G MLPS = 42 |
| SESSION-ID_56 | SOURCE ADDRESS | PCC_RULE_2 PCC_RULE_3 QCI = 2 | SWITCHING_RULE_2 @ PORT P SWITCHING_RULE_4 @ PORTS R, T, S |
| SESSION-ID_978 | APP_ID_4 SOURCE ADDRESS | PCC_RULE_5 | SWITCHING_RULE_3 @ PORT Y |
| SESSION-ID_1254 | DESTINATION ADDRESS SOURCE ADDRESS APP_ID_3 | PCC_RULE_2 PCC_RULE_7 | SWITCHING_RULE_6 @ PORT E MLPS = 40 |
| SESSION-ID_2781 | SOURCE ADDRESS | PCC_RULE_3 | SWITCHING_RULE_5 @ PORT W |
| SESSION-ID_3871 | DESTINATION ADDRESS SOURCE ADDRESS APP_ID_1 APP_ID_2 | PCC_RULE_2 PCC_RULE_5 PCC_RULE_6 | SWITCHING_RULE_6 @ PORT H SWITCHING_RULE_7 @ PORT Y |

METHODS, SYSTEMS, AND COMPUTER READABLE MEDIA FOR SESSION BASED SOFTWARE DEFINED NETWORKING (SDN) MANAGEMENT

TECHNICAL FIELD

The subject matter described herein relates to software defined networking (SDN) management. More specifically, the subject matter relates to methods, systems, and computer readable media for session based SDN management.

BACKGROUND

In telecommunications networks, global Internet protocol traffic is increasing at a rate of forty to fifty percent per year. In order to retain subscribers, it is desirable for service providers to keep monthly charges to subscribers relatively unchanged. Keeping charges constant with increasing traffic requires a reduction in expenses. For example, with a forty percent increase in traffic, service providers must reduce capital expenses and operational expenses by forty to fifty percent per gigabyte per second per year to achieve relatively constant pricing.

One possible method for reducing capital and operational expenses is to use software defined networking (SDN). SDN can be used to manage flows, control switches, control network access, and track user location and motion. SDN can also be used to efficiently utilize network components. For example, SDN may be used to power off unused equipment during non-peak periods to conserve energy.

Some SDN models may centralize the control of network elements, such as routers and switches, by removing intelligence from the routers and switches and placing that intelligence in a centralized location. One such effort to provide centralized control of routers and switches is the OpenFlow architecture described in the OpenFlow Switch Specification, Version 1.1.0, Feb. 28, 2011, the disclosure of which is incorporated herein by reference in its entirety. Conventionally, SDN architecture has not been used to control telecommunications network elements.

While some SDN controllers are being integrated with 3GPP core network systems, such integrations have usability and efficiency issues. In particular, these systems provide Internet protocol (IP) flow level control which is resource inefficient and is not scalable for a large and/or busy network. For example, the number of active IP flows in a public network, such as the Internet, may easily be in the millions or even billions for any given period of time. Since the number of IP flows utilized in a network can be very large, IP flow level control on controllers and switches involved in data plane connectivity is resource (e.g., memory) intensive and cost prohibitive. While some approaches may limit the amount of flow information stored in such switches, such as frequent updating the flow information to reduce the number of unused flow data entries that the switch must process through for each packet that hits the switch; such approaches still present scalability and resource efficiency issues.

Accordingly, a need exists for methods, systems, and computer readable media for session based SDN management.

SUMMARY

Methods, systems, and computer readable media for session based software defined networking (SDN) management are disclosed. According to one method, the method occurs at a policy engine. The method includes determining, using a session identifier, Third Generation Partnership Project (3GPP) session information associated with a user device. The method also includes generating, using the 3GPP session information, SDN policy information for SDN related traffic associated with the 3GPP session, wherein the SDN policy information is for providing a quality of service (QoS) for the SDN related traffic corresponding to a QoS associated with the 3GPP session information, wherein the SDN related traffic is correlated with the 3GPP session using a source address associated with the user device.

According to one system, the system includes a policy engine comprising at least one processor and a memory. The policy engine is configured to determine, using a session identifier, 3GPP session information associated with a user device and to generate, using 3GPP session information, SDN policy information for SDN related traffic associated with the 3GPP session, wherein the SDN policy information is for providing a QoS for the SDN related traffic corresponding to a QoS associated with the 3GPP session information, wherein the SDN related traffic is correlated with the 3GPP session using a source address associated with the user device.

The subject matter described herein may be implemented in software in combination with hardware and/or firmware. For example, the subject matter described herein may be implemented in software executed by a processor. In some implementations, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 4 is a diagram illustrating policy and/or SDN related information according to an embodiment of the subject matter described herein;

DETAILED DESCRIPTION

Figure 1:
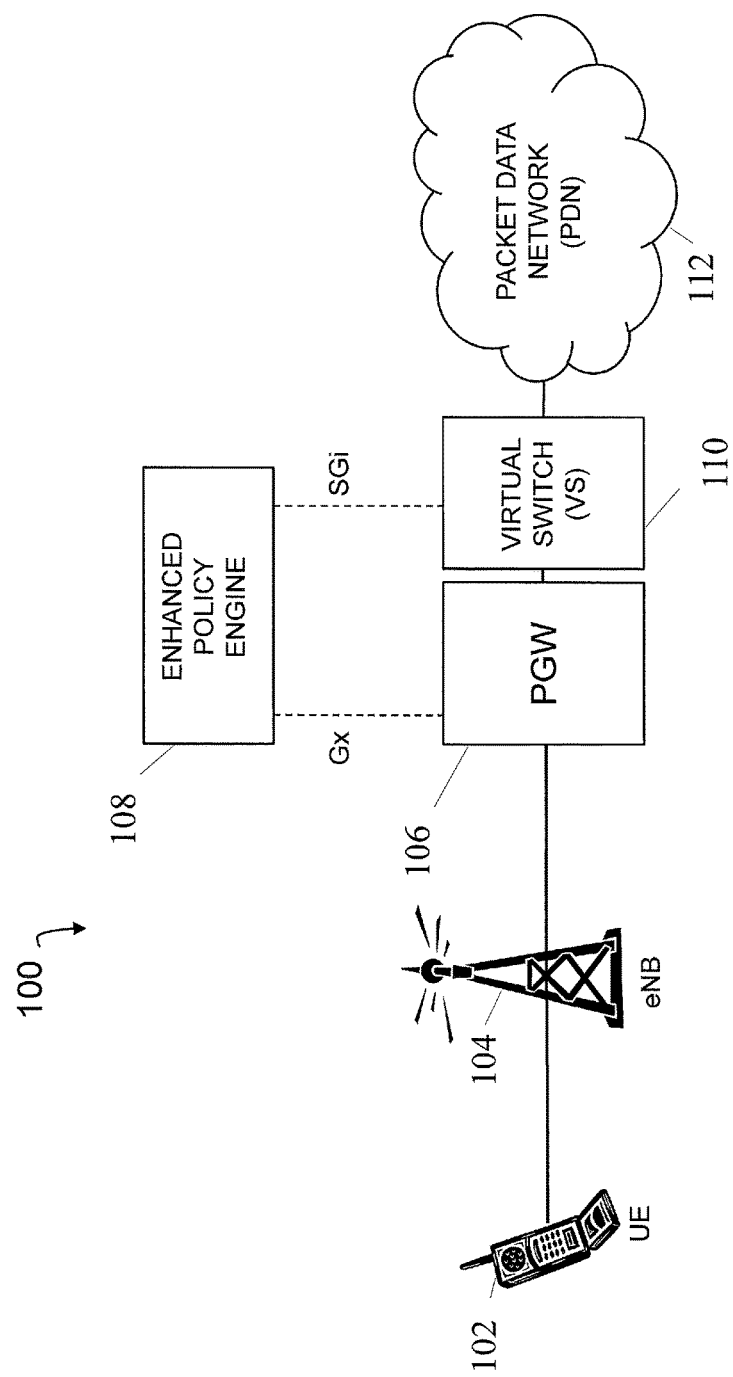
FIG. 1 is a diagram illustrating a communications network according to an embodiment of the subject matter described herein.

The subject matter described herein relates to methods, systems, and computer readable media for session based software defined networking (SDN) management. Conventional SDN controllers provide Internet protocol (IP) flow level management for traffic in a software defined network. For example, an SDN controller may provision an SDN enabled device, such as a virtual switch, with various rules for handling or processing individual IP flows, e.g., as identified by a 5-tuple including source address, destination address, source port, destination port, and a protocol identifier. While IP flow level control can provide granularity for network operators, the number of IP flows potentially utilized in a packet data network (PDN) makes such SDN controllers less than ideal for large or busy networks.

In accordance with some aspects of the subject matter described herein, techniques, methods, and/or mechanisms for performing and/or facilitating session based SDN management are provided. For example, a policy engine or related node may group policy and/or network control information (e.g., SDN policy information) using a Third Generation Partnership Project (3GPP) (e.g., Diameter or Gx) session identifier associated with a user device. In this example, the 3GPP session identifier may be associated with related IP flows in a PDN using a source address associated with the user device. Using session based management, various SDN related rules may be provided to virtual switches or other SDN enabled devices such that flows associated with a user device are provided policy (e.g., QoS) treatment in a PDN that is similar or corresponding to policy treatment of corresponding flows in a 3GPP network (e.g., an evolved packet system (EPS)).

By grouping SDN policy information based on sessions, resources are conserved and performance is improved. For example, by grouping related IP flows into an SDN session and/or by utilizing SDN related rules that are session level and not IP flow level, the amount of memory needed to store the rules (e.g., as flow table entries) may be significantly less than is needed for conventional SDN controllers. Furthermore, when an SDN controller is deployed in a per network context, the SDN controller can use performance gains to provide finer grained control for IP flows. For example, where conventionally DPI-like control was not possible, DPI level control may be utilized by storing data entries (e.g., flow table entries) for controlling IP flows associated with certain applications or destinations (e.g., application servers).

In accordance with some aspects of the subject matter described herein, techniques, methods, and/or mechanisms are provided for performing proportional policy treatment in an SDN network based on related policy treatment in a 3GPP network. For example, in a 3GPP network, a PDN connection or an EPS bearer may request a data transfer rate of 5 megabits per seconds (Mb/s). In this example, the 3GPP network may allocate 4 Mb/s of the requested 5 Mb/s. Continuing with this example, in an SDN network, a policy engine or related node may generate and/or provide rules that allocate resources based on the allocation in the 3GPP network, e.g., each IP flow in the SDN network associated with the session may be proportionately compressed by 20%.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating a communications network 100 according to an embodiment of the subject matter described herein. Referring to FIG. 1, network 100 may include user equipment (UE) 102, an evolved node b (eNB) 104, a packet gateway (PGW) 106, an enhanced policy engine (EPE) 108, a virtual switch 110, and a packet data network (PDN) 112.

UE 102 may represent a user device, such as a mobile handset, for communicating with one or more portions of network 100. For example, UE 102 may include a computer, a pager, a smartphone, a phone, a wireless modem, a hotspot, a computing platform, a mobile handset, and other subscriber device.

UE 102 may communicate with eNB 104. ENB 104 may be located within an access network (not shown). An access network may include nodes, functions, devices, and/or components for providing a UE 102 access to services, functions, or devices in one or more networks (e.g., PDN 112). For example, an access network may include a radio access network (RAN) or other access network, such as a Global System for Mobile Communications (GSM) RAN (GRAN), a GSM enhanced data rates for GSM evolution (EDGE) RAN (GERAN), a general packet radio service (GPRS) access network, a universal mobile telecommunications system (UMTS) RAN (UTRAN), an evolved UTRAN (eUTRAN), an Internet protocol (IP) connectivity access network (IP CAN), a code division multiple access (CDMA) network, an Evolution-Data Optimized (EV-DO), a wideband CDMA (WCDMA) network, a High Speed Packet Access (HSPA) network, or an evolved HSPA (eHSPA+) network.

ENB 104 may perform radio access functions for connecting UE 102 with various communications networks and/or nodes. ENB 104 may communicate with one or more nodes within the network 100. For example, eNB 104 may communicate messages (e.g., authentication or mobility related messages) to PGW 106 or EPE 108 within the network 100.

Network 100 may include a core network for providing UE related services. For example, a core network may perform network aggregation, charging, and authentication functions for UE 102. In some embodiments, a core network may be at least one of a 3G network, a 3G+ network, a GSM network, a 4G network, an LTE network, an EPC network, a 3GPP network, a GPRS core network, or other network.

In some embodiments, network 100 may include a 3GPP network (e.g., an EPS or an LTE network) for providing UE related services. For example, a 3GPP network may perform network aggregation, charging, and/or authentication functions for UE 102. In this example, the 3GPP network nay include PGW 106, EPE 108, and other nodes, such as a subscriber profile repository (SPR), a Diameter relay agent and/or a Diameter signaling router (DRA/DSR), a mobility management entity (MME), a home subscriber server (HSS), an authentication, authorization, and accounting (AAA) server, and a bearer binding and event reporting function (BBERF).

PGW 106 may be any suitable entity for communicating with PDN 112 and/or other related node. For example, PGW 106 may include functionality for communicating between networks, e.g., a 3GPP core network and PDN 112. In some embodiments, PGW 106 may include a policy and charging enforcement function (PCEF) and may manage and enforce policy and charging control (PCC) rules provided by EPE 108. For example, rules may be provided for each service data flow (SDF) (e.g., one or more packet flows that match certain criteria) and/or UE 102 attempting to use PGW 106. In this example, PGW 106 may control access to external networks and charge for such access based on rules received from EPE 108.

EPE 108 may be any suitable entity for creating, selecting, or otherwise determining policies (e.g., one or more PCC rules). For example, EPE 108 may include a policy and charging rules function (PCRF) and may be a stand-alone node, e.g., a policy server or a multimedia policy engine (MPE), or may be co-located or integrated with one or more nodes in network 100, e.g., a DRA/DSR.

In some embodiments, EPE 108 may inform PGW 106, via a Gx interface or other interface and using PCC rules, on the treatment of each SDF that is under PCC control, in accordance with policy decisions. In performing policy decisions, EPE 108 may communicate with one or more nodes in network 100 for gathering user related information. For example, EPE 108 may communicate with an SPR to retrieve subscriber information. In another example, EPE 108 may communicate with a network management system (NMS), e.g., via a simple network management protocol (SNMP) interface. In this example, EPE 108 may poll or otherwise query the NMS or a related database to receive information, e.g., regarding the state of one or more devices in an access network, core network, or other network.

In some embodiments, EPE 108 may inform virtual switch 110, via an SDN related interface and using SDN related rules, on the treatment of IP flows associated with a 3GPP session, in accordance with policy decisions. For example, EPE 108 may include an SDN controller that may utilize an SGi interface or other interface for communicating SDN related rules to SDN enabled devices. In this example, the SDN related rules may include information for treating IP flows (e.g., in the SDN or PDN network) similarly to traffic in a corresponding 3GPP session and may include a UE source address or other information for identifying or correlating IP flows associated with the SDN related rules.

EPE 108 may include and/or access storage (e.g., a policy and/or SDN information database) for determining 3GPP policy information and SDN policy information. For example, a database may contain associations between session identifiers and policy information for 3GPP and SDN related networks. In this example, the database may store PCC rules and/or SDN related rules with a session identifier (e.g., a Diameter Gx session identifier and/or UE IP address) associated with UE 102.

Virtual switch 110 may be any suitable entity for directing, handling, switching, or processing traffic using SDN related rules and/or other information from EPE 108 or an SDN controller. For example, virtual switch 110 may receive switching rules from an SDN controller via an SGi interface or another SDN related interface. In this example, virtual switch 110 may be configured to use switching rules to control and/or direct IP flows, e.g., switching rules may direct some IP flows, via different ports, to less congested and/or higher QoS paths in PDN 112. In another example, switching rules may include multiprotocol label switching (MPLS) labeling rules for adding an MPLS label to each packet of an IP flow for QoS purposes.

PDN 112 may be a data network and may provide various services and/or data to UE 102, e.g., via one or more intermediary nodes. In some embodiments, PDN 112 may include a public network, such as the Internet, and/or a private network. PDN 112 may utilize one or more various mechanisms for prioritizing traffic and/or routes and/or for providing different QoS. For example, PDN 112 may use MPLS. In this example, PDN 112 may direct traffic (e.g., data packets) based on short path labels, where the labels identify virtual links (e.g., paths) between nodes rather than endpoints.

It will be appreciated that FIG. 1 is for illustrative purposes and that various nodes, their locations, and/or their functions may be changed, altered, added, or removed. For example, some nodes and/or functions may be combined into a single entity, e.g., a SPR and EPE 108 may be integrated. In a second example, a node and/or function may be located at or implemented by two or more nodes, e.g., EPE 108 may be implemented as a PCRF node and an SDN controller node.

Figure 2:
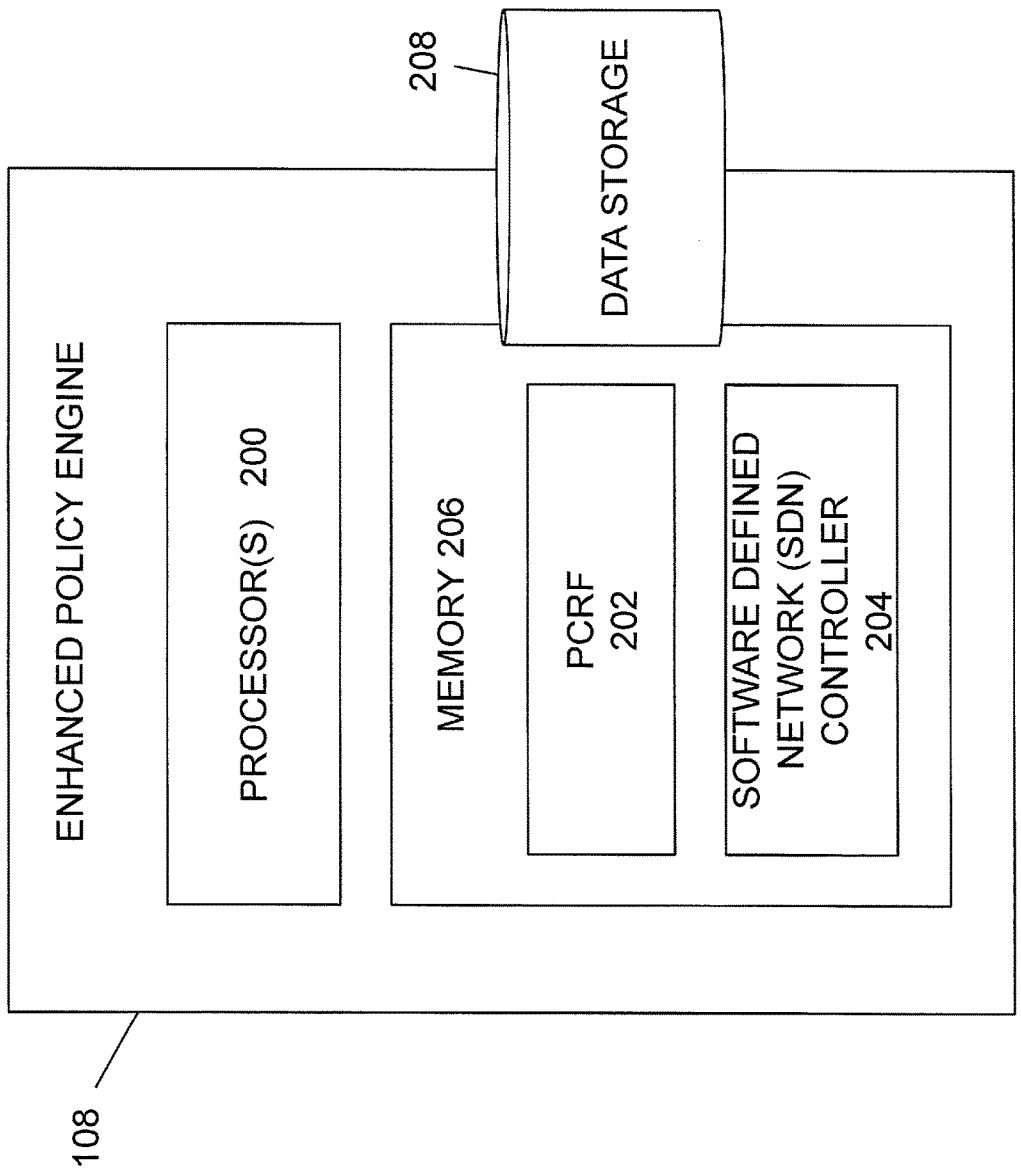
FIG. 2 is a diagram illustrating an enhanced policy node according to an embodiment of the subject matter described herein.

FIG. 2 is block diagram illustrating an EPE 108 according to an embodiment of the subject matter described herein. In some embodiments, EPE 108 may comprise a special purpose computing device or machine that includes hardware components (e.g., one or more processor units, memory, and network interfaces) configured to execute software elements (e.g., applications, software modules, etc.) for the purposes of performing one or more aspects of the disclosed subject matter herein. In addition, it should be noted that EPE 108 and its components and functionality described herein may constitute a special purpose computer that improves the technological field pertaining to SDN management by providing mechanisms for grouping and/or utilizing SDN policy information for related IP flows using one or more session identifiers.

Referring to FIG. 2, EPE 108 may include one or more processor(s) 200, memory 206, and data storage 208. For example, processor(s) 200 may include a physical or hardware implemented processor for executing software or executable instructions and memory 206 may include a non-transitory computer readable medium for storing executable instructions or software. In this example, processor(s) 200 may execute software and/or executable code stored in memory 202.

EPE 108 may include a PCRF 202 and an SDN controller 204. PCRF 202 may include functionality (e.g., software executing on processor(s) 200) for generating and/or providing policy information associated with a user device and/or a 3GPP session. For example, PCRF 202 may retrieve, generate, and/or provide PCC rules for a given 3GPP session associated with UE 102. For example, a PCC rule may include a rule name, service identifier, SDF filter(s), precedence information, gate status, QoS parameters, charging key (i.e., rating group), other charging parameters, and/or monitoring key. The rule name or PCC rule identifier may be used to reference a PCC rule in the communication between a PCEF (e.g., PGW 106) and PCRF 202 and may be unique for each PCC rule used during a 3GPP (e.g., IP connectivity access network (IP-CAN)) session. The service identifier may be used to identify the service or the service component to which the SDF relates. The SDF filter(s) may be used to select the traffic for which the rule applies. For example, an SDF filter make take the form of an IP five-tuple specifying: (1) source IP address(es), (2) destination IP address(es), (3) source port number(s), (4) destination port number(s), and (5) application protocol(s) (e.g., transmission control protocol (TCP), user datagram protocol (UDP)). In this example, packets containing information matching the IP five-tuple may be considered part of the SDF for which the corresponding PCC rule is to be applied. In another example, an SDF filter may be based on fewer, different, and/or additional criteria. For instance, UE 102 or another node in network 100 may assign an SDF identifier (e.g., a value) to packets in a custom parameter field. In this instance, an SDF filter in a PCC rule may use this parameter for determining traffic for which the rule applies.

SDN controller 204 may include functionality (e.g., software executing on processor(s) 200) for generating and/or providing SDN policy information (e.g., switching rules and MPLS labeling rules) to an SDN enabled device, such as virtual switch 110. For example, SDN controller may generate switching rules for directing IP flows in PDN 112 that are associated with a 3GPP session. In this example, the switching rules may provide correlation information for identifying IP flows associated with the 3GPP session and may be usable to provide a similar level of QoS as corresponding SDFs in the related 3GPP session.

In some embodiments, EPE 108 may include one or more communications interfaces for communicating policy related messages, e.g., via a Gx interface, Gxx interface, Sp interface, an extensible markup language (XML) interface, a session initiation protocol (SIP) interface, a SOAP interface, or a hypertext transfer protocol (HTTP) interface or others. For example, a Gx interface may be used for sending policy related messages between EPE 108 and PGW 106.

In some embodiments, EPE 108 may include one or more communications interfaces for communicating SDN related messages, e.g., via an SGi interface, an OpenFlow protocol interface, a network virtualization using generic routing encapsulation (NVGRE) protocol interface, a virtual extensible LAN (VXLAN) protocol interface, a forwarding and control element separation (ForCES) protocol interface, an open vSwitch database management (OVSDB) protocol interface, or others. For example, a SGi interface may be used for sending SDN related messages between EPE 108 and virtual switch 110.

EPE 108 may access and/or store policy and/or SDN related information in data storage 208. Data storage 208 may represent any suitable entity (e.g., a data storage device or a computer readable medium) for storing policy information associated with 3GPP sessions and/or SDN related information, such as switching rules, for directing corresponding IP flows (e.g., in PDN 112) associated with the 3GPP sessions.

In some embodiments, data storage 208 may be integrated or co-located with EPE 108 or may be located at a node distinct from EPE 108. In some embodiments, data storage 208 may store SDN policy information and 3GPP policy information correlated by session identifiers and/or other identifying information. For example, data storage 208 may store switching rules and PCC rules that are indexed using a Diameter Gx session identifier or other identifiers, such as a source IP address assigned to UE 102 by PDN 112.

It will be appreciated that FIG. 2 is for illustrative purposes and that various nodes, their locations, and/or their functions may be changed, altered, added, or removed.

Figure 3:
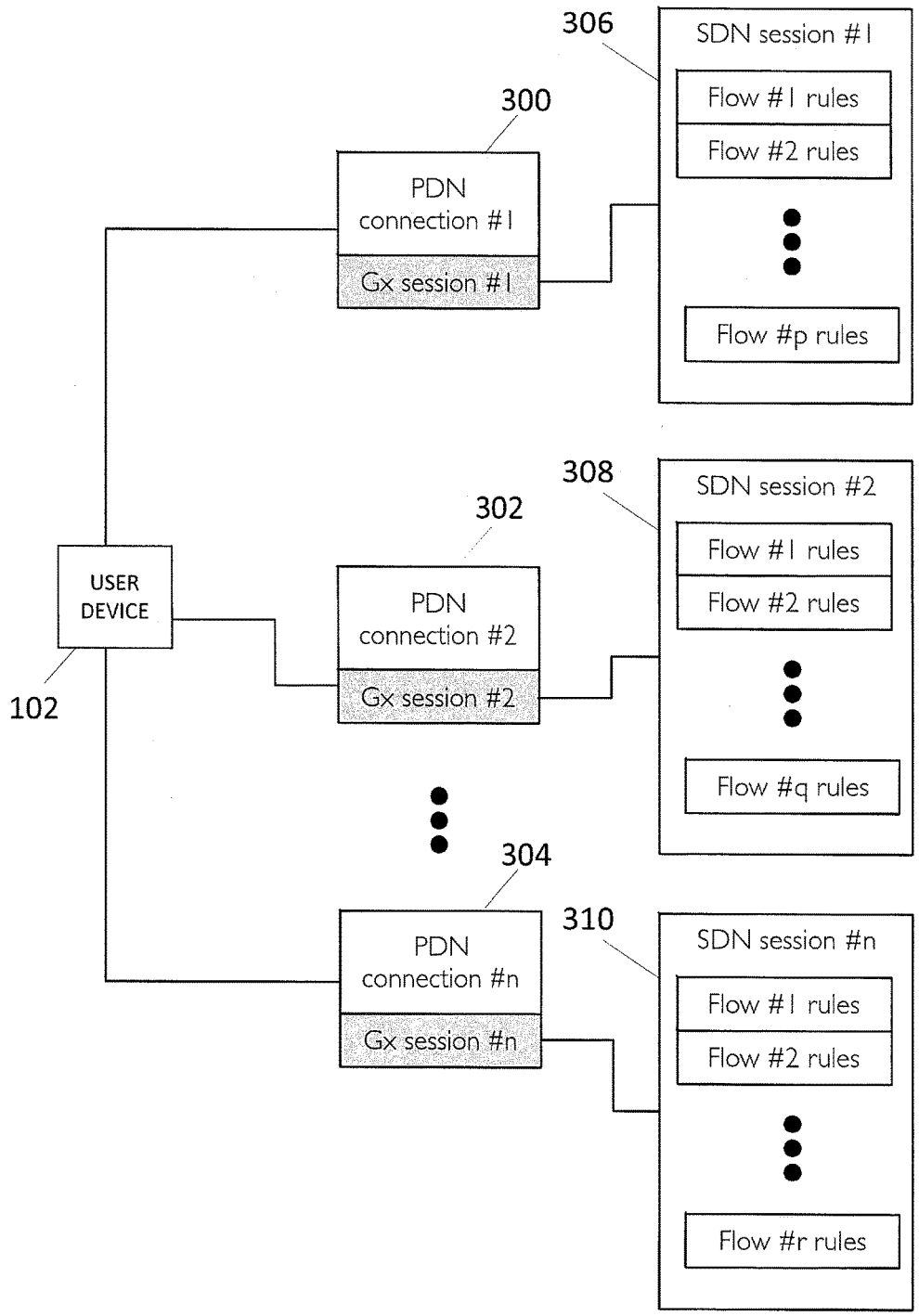
FIG. 3 is a diagram illustrating correlation of Diameter Gx session information and software defined networking (SDN) session information according to an embodiment of the subject matter described herein.

FIG. 3 is a diagram illustrating correlation of Diameter Gx session information and SDN session information according to an embodiment of the subject matter described herein. In some embodiments, EPE 108 may utilize an SDN session for managing and/or providing SDN related information to related IP flows. For example, an SDN session may represent state information and/or a collection of rules for IP flows associated with UE 102 and/or a corresponding 3GPP session.

In some embodiments, an SDN session may be correlated with a PDN connection, a Diameter Gx session, and/or an EPS bearer. For example, UE 102 may establish a number of PDN connections. Each PDN connection may be associated with an access point name (APN), e.g., PDN 112, and an IP address assigned to UE 102 by the APN. Each PDN connection may also include one or more EPS bearer connections, such as an EPS default bearer and an EPS dedicated bearer. Each EPS bearer connection may be associated with a bearer identifier and QoS parameters. Each bearer connection may use one or more traffic flow template (TFTs) for indicating which IP packets should be sent via a particular bearer connections and may include filters or rules on the basis of IP packet destination, IP packet source, or protocol used. In this example, EPE 108 may generate SDN related information for an SDN session such that QoS and/or traffic treatment for related IP flows in the PDN 112 is similar and/or proportional to QoS and/or traffic treatment of corresponding traffic in the 3GPP network.

Referring to FIG. 3, UE 102 may be associated with PDN connections 300-304. Each of the PDN connections 300-304 may be associated with a unique Diameter Gx session identifier. Each Diameter Gx session identifier may represent and/or be associated with an SDN session, e.g., SDN session 306-310. Each of SDN sessions 306-310 may represent a set of IP flow rules or other SDN policy information. For example, IP flow rules may be sent from SDN controller 204 to virtual switch 110 via an SGi interface or other SDN related interface. In this example, each IP flow rule may be for controlling and/or directing an IP flow via a particular path having particular QoS attributes in PDN 112.

In some embodiments, EPE 108 may correlate 3GPP session information (e.g., applied as Diameter Gx sessions) with corresponding SDN session information (e.g., applied as IP flow control), thereby facilitating a seamless QoS across a 3GPP network (e.g., an EPS bearer connection between UE 102 and PGW 106) and a PDN 112 (e.g., an SDN related path between PGW 106 and PDN 112). For example, assuming a bearer connection is assigned a QCI value of '3' in a 3GPP network, the QCI value may be pushed via a Gx interface to PGW 106. On the SDN session side, the QCI value may be mapped to an IP flow treatment specific for providing a corresponding QoS to one or more IP flows in PDN 112. In this example, assuming MPLS is used for QoS purposes in PDN 112, EPE 108 and/or SDN controller 204 may provide an SDN related rule for including an MPLS tag of '42' in relevant IP data packets egressing PGW 106 to PDN 112. In another example, instead of using MPLS labeling, an SDN related rule may involve marking the IP data packets as belonging to a specific VLAN, marking the IP data packets using differentiated services code point (DSCP) values, or sending the IP data packets via a particular port of virtual switch 110.

In some embodiments, an SDN session may be useful for applying Class of Service (CoS), QoS, or QoE treatments for various purposes and/or based on various factors, e.g., based on time requirements (e.g., time of day) and/or using other network information (e.g., real-time usage or congestion information). For example, when an SDN policy is applied across networks for a specific service (e.g., a machine to machine (M2M) service), an SDN session may be useful for applying treatments to multiple IP flows associated with the specific service.

It will also be appreciated that FIG. 3 for illustrative purposes and that different and/or additional data than the data depicted in FIG. 3 may be usable for session based SDN management.

FIG. 4 is a diagram illustrating policy and/or SDN related information 400 according to an embodiment of the subject matter described herein. In some embodiments, information 400 may be accessed and/or stored by EPE 108 using various data structures.

Referring to FIG. 4, information 400 may include associations between Diameter and/or IP CAN session identifiers and session information (e.g., PCC rules and SDN related rules) and may be depicted using a table. The table of FIG. 4 depicts information 400 as rows (e.g., entries). Each row may be indexed by a Diameter and/or IP CAN session identifier. For example, a Diameter and/or IP CAN session identifier may represent any information (e.g., parameter(s) and/or attribute value pair (AVP)) for identifying a PDN connection, an EPS bearer connection, and/or a Diameter Gx session.

Each row may include related identifiers. For example, a related identifier may represent any information, such as an UE source address assigned by an APN (e.g., PDN 112) via PGW 106, for correlating one or more IP flows and a 3GPP session. In some embodiments, additional identifiers may be used to identify or correlate relevant IP flows, e.g., application identifiers, destination addresses, port information, etc. For example, if deep packet inspection (DPI) is utilized, application identifiers may be stored such that certain application traffic is treated differently than other traffic from UE 102.

Each row may include policy and/or charging information. For example, policy and/or charging information may represent any information, such as PCC rules or QCI values, for indicating how traffic is to be handled, processed, and/or charged. In some embodiments, PCC rules may be associated with traffic for a particular application and/or destination.

Each row may include network control or SDN related information. For example, network control information may represent any information (e.g., labeling rules, DSCP labeling rules, or switching or port rules) for indicating how traffic is to be handled, processed, and/or charged in PDN 112 or an SDN related network. In some embodiments, network control rules may be dynamically generated and/or predetermined based on corresponding policy and/or charging information (e.g., PCC rules and/or QCI values) associated with a related 3GPP session.

It will also be appreciated that information 400 is for illustrative purposes and that different and/or additional data than the data depicted in FIG. 4 may be usable for session based SDN management. Further, information 400 may be stored or managed using various data structures and/or computer readable media.

Figure 5:
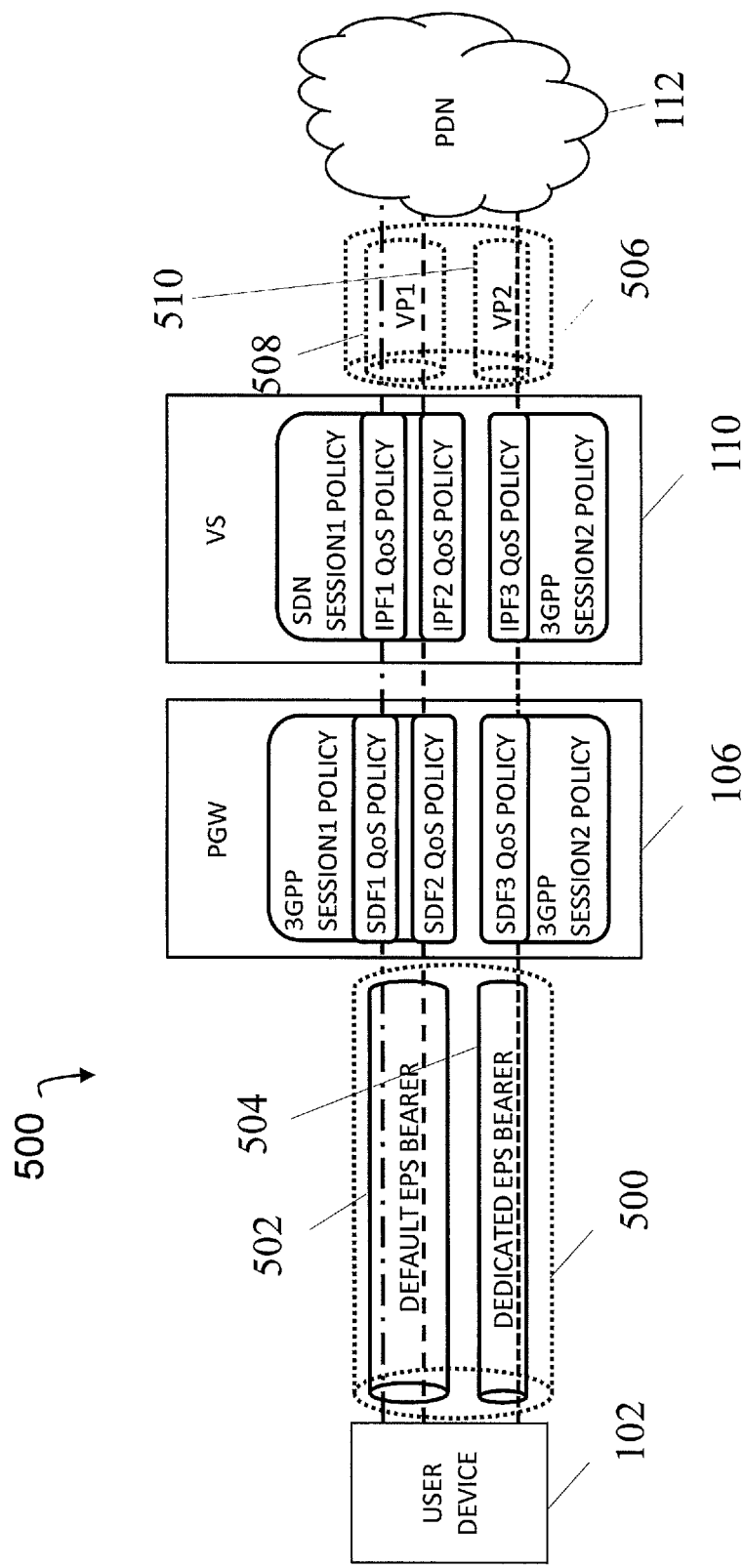
FIG. 5 is a diagram illustrating policy treatment of traffic traversing a packet gateway (PGW) according to an embodiment of the subject matter described herein.

FIG. 5 is a diagram illustrating policy treatment of traffic traversing PGW 106 according to an embodiment of the subject matter described herein. In some embodiments, traffic traversing PGW 106 may involve two different networks (e.g., a 3GPP network and PDN 112) and may require setting up two different QoS or policy treatments. For example, a first policy treatment may be associated with a first connection (e.g., a 3GPP related connection) from UE 102 to PGW 106 and a second policy treatment may be associated with a second connection (e.g., SDN related connection) from PGW 106 and/or virtual switch 110 to PDN 112. In this example, each treatment may be logically represented a pipe, where each pipe includes certain QoS attributes and where each pipe may include smaller pipes and flows having additional QoS attributes.

Referring to FIG. 5, UE 102 may be connected to PGW 106 via a pipe 500. Pipe 500 may represent a 3GPP connection (e.g., an EPS or PDN connection) and may include one or more EPS bearer connections, e.g., default EPS bearer 502 and a dedicated EPS bearer 504. Each bearer connection may be associated with certain QoS or CoS attributes (e.g., as determined by a QCI value). Each bearer connection may be associated with one or more SDFs.

In some embodiments, PGW 106 may receive PCC rules, TFTs, and/or other information (e.g., from EPE 108) for determining how SDFs are to be handled in a 3GPP network. For example, a first session policy may be associated with default EPS bearer 502. In this example, each SDF associated with default EPS bearer 502 may include additional policies (e.g., PCC rules). In another example, a second session policy may be associated with dedicated EPS bearer 504. In this example, each SDF associated with dedicated EPS bearer 504 may include additional policies (e.g., PCC rules).

Virtual switch 110 may be connected to PDN 112 via a pipe 506. Pipe 506 may represent an SDN related connection and may include one or more virtual pipes (VPs), e.g., a VP1 508 and a VP2 510. Each VP may be associated with certain QoS or CoS attributes (e.g., as determined by MPLS, DSCP, or other mechanisms), where the QoS or CoS attributes may correspond or map to 3GPP policies for related sessions. Each VP may be associated with one or more IP flows.

In some embodiments, virtual switch 110 may receive switching rules, MPLS labeling rules, and/or other information (e.g., from EPE 108) for determining how IP flows are to be handled in an SDN related network (e.g., PDN 112). For example, a first session policy may be associated with VP1 508. In this example, each IP flow associated with VP1 508 may include additional policies (e.g., MPLS labeling rules or port rules). In another example, a second session policy may be associated with VP2 510. In this example, each IP flow associated with VP2 510 may include additional policies (e.g., MPLS labeling rules or port rules).

In some embodiments, an SDN session may represent a logical grouping of related IP flows based on one or more common identifiers. For example, related IP flows in an SDN session may be identified or correlated using a source IP address assigned to UE 102. In another example, related IP flows in an SDN session may be identified or correlated using a bearer identifier and/or a source IP address associated with a 3GPP session. In yet another example, related IP flows in an SDN session may be identified or correlated using an application identifier, a destination IP address, and/or a source IP address associated with a 3GPP session.

In some embodiments, an SDN session may include IP flows that are associated with multiple EPS bearers in a 3GPP network. For example, where an SDN session is determined based on a Diameter Gx session identifier, flows associated with VP1 508 (and default EPS bearer 502) and flows associated with VP2 510 (and dedicated EPS bearer 504) may be controlled using the same SDN session policy.

In some embodiments, an SDN session may include IP flows that are associated with a single EPS bearer in a 3GPP network. For example, as depicted in FIG. 5 and where an SDN session is determined based on a Diameter Gx session identifier and a bearer identifier, flows associated with VP1 508 (and default EPS bearer 502) may be controlled using one SDN session policy and flows associated with VP2 510 (and dedicated EPS bearer 504) may be controlled using another SDN session policy.

In some embodiments, an SDN session may be usable for applying QoS and/or allocating resources proportionally. For example, depending on resource availability and network conditions, QoS and/or resources associated with pipe 506, VP1 508, and/or VP2 510 may contract or expand relative to QoS and/or resources utilized by corresponding 3GPP connections (e.g., pipe 500, default EPS bearer 502 and a dedicated EPS bearer 504. For instance, if bandwidth is limited in a 3GPP network, a PDN connection may be allocated a data transfer rate of 4 Mb/s in the 3GPP network instead of a requested data transfer rate of 5 Mb/s, e.g., a 20% reduction. In this instance, if bandwidth is also limited in the SDN related network, an SDN session policy may generate and/or provide rules to virtual switch 110 that proportionally reduce data transfer rates for IP flows in the SDN session by the amount reduced in the 3GPP network, e.g., a 20% reduction.

In some embodiments, by using SDN sessions, additional functionality may be performed. For example, DPI-like control may be utilized for controlling IP flows associated with a particular application. In this example, an SDN session policy associated with a particular application may be usable for encouraging or discouraging such traffic, e.g., via either enhanced or degraded treatment relative to other traffic associated with UE 102.

It will also be appreciated that FIG. 5 is for illustrative purposes and that different and/or additional entities than those depicted in FIG. 5 may be involved with session based SDN management.

Figure 6:
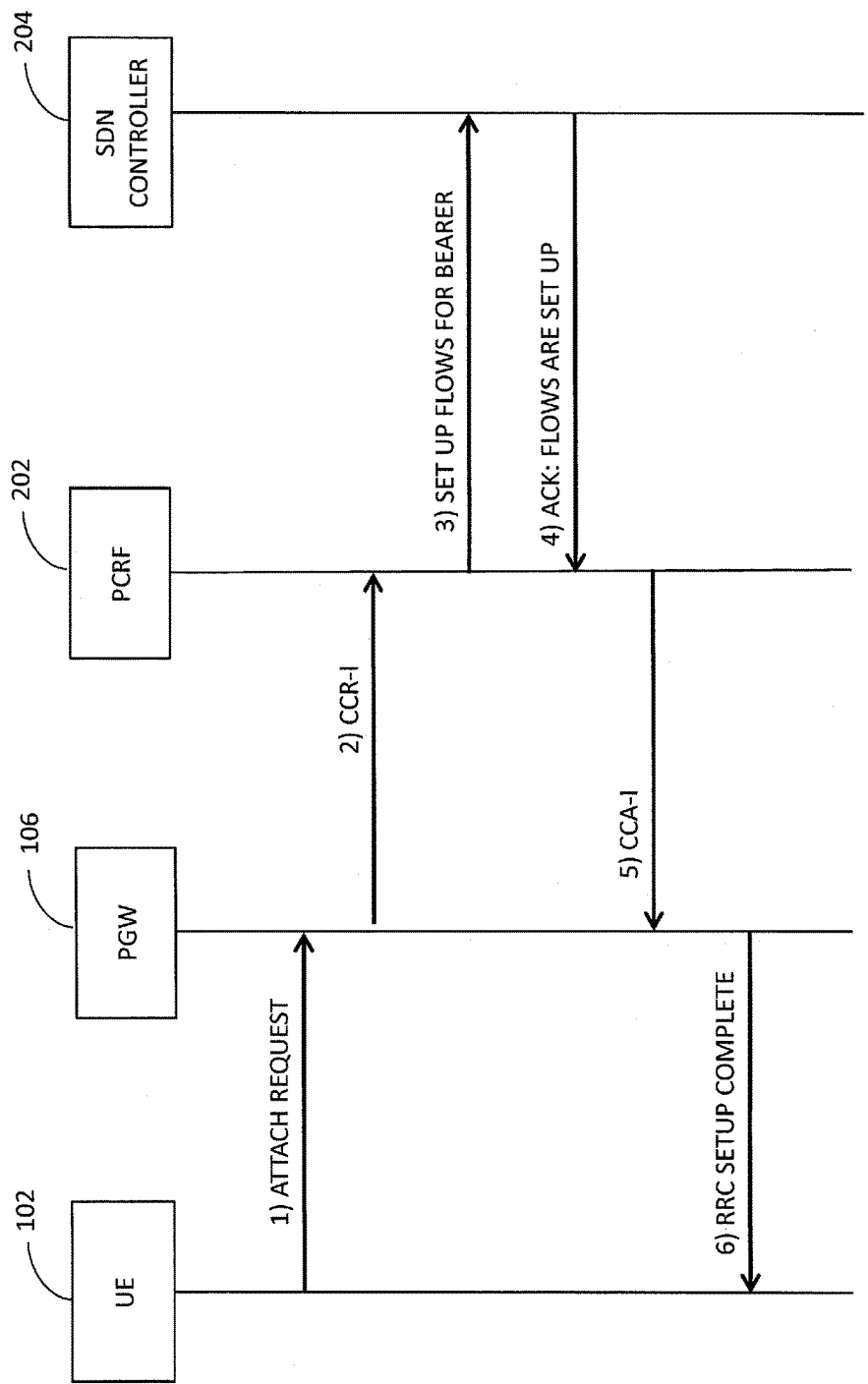
FIG. 6 is a diagram illustrating an attach procedure according to an embodiment of the subject matter described herein.

FIG. 6 is a diagram illustrating an attach procedure according to an embodiment of the subject matter described herein. In some embodiments, an attach procedure may occur when UE 102 is attempting to establish a PDN connection with an APN (e.g., PDN 112).

Referring to FIG. 6, in step 1, an attach request may be sent from UE 102 to PGW 106 and may include a PDN connectivity request for establishing a PDN connection and an EPS bearer connection.

In step 2, a Gx message may be sent from PGW 106 to PCRF 202. For example, the Gx message may be any message, such as a credit control request initial (CCR-I) message, communicated via a Gx interface for requesting policy information associated with a PDN session. The Gx message may be for requesting PCC rules and may include a subscriber identifier and other information.

In some embodiments, after receiving a Gx message from PGW 106, PCRF 202 may request and receive subscriber profile information from an SPR and may use this information in generating appropriate PCC rules.

In step 3, after receiving a Gx message but prior to sending a response message, one or more messages may be sent from PCRF 202 to SDN controller 204 for triggering SDN controller 204 to generate and/or provide SDN policy information for controlling IP flows related to the PDN connection.

In some embodiments, SDN controller 204 may identify an SDN session (e.g., using a 3GPP session identifier and/or other 3GPP session information) and may determine SDN related rules for each IP flow associated with the SDN session. In such embodiments, the SDN related rules may be sent to and/or enforced by virtual switch 110 and/or another SDN enabled device.

In step 4, after SDN policy information has been sent for controlling related IP flows, an acknowledgement message may be sent from SDN controller 204 to PCRF 202.

In some embodiments, PCRF 202 may not return a Gx response message back to PGW 106 until after an acknowledgement message from SDN controller 204 indicating that SDN related policy has been sent and/or setup.

In some embodiments, PCRF 202 may return a Gx response message back to PGW 106 prior to receiving an acknowledgement message from SDN controller 204 indicating that SDN related policy has been sent and/or setup.

In step 5, after receiving an acknowledgement message from SDN controller 204, a Gx response message may be sent from PCRF 202 to PGW 106. For example, the Gx response message may be any message, such as a credit control answer initial (CCA-I) message, communicated via a Gx interface for providing policy information associated with a PDN session. The Gx response message may include one or more PCC rules.

In some embodiments, after receiving a Gx response message from PCRF 202, PGW 106 may allocate resources for a PDN connection and enforce received PCC rules.

In step 6, a radio resource control (RRC) connection setup complete message may be sent from PGW 106 to UE 102 for confirming a successful completion of an RRC connection.

It will also be appreciated that the above described messages are for illustrative purposes and that different and/or additional messages may be used. For example, while FIG. 6 depicts communications between PCRF 202 and SDN 204, it is appreciated that these communications may be internal (e.g., via a communications bus) in EPE 108. Further, additional entities, such as an MME and an HSS, may also be utilized in performing one or more portion of an attach procedure.

Figure 7:
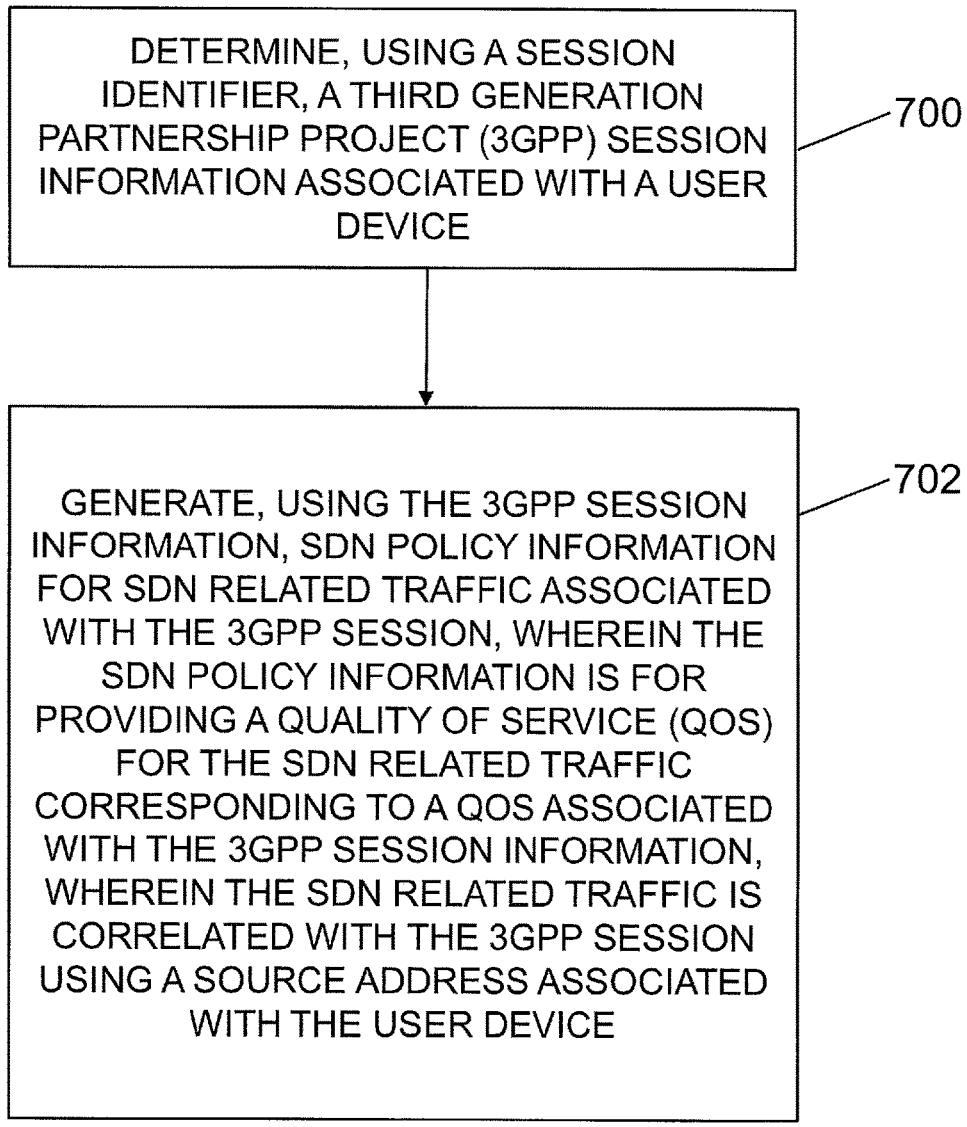
FIG. 7 is a diagram illustrating a process for session based SDN management in according to an embodiment of the subject matter described herein.

FIG. 7 is a diagram illustrating a process 700 for session based SDN management according to an embodiment of the subject matter described herein. In some embodiments, process 700, or portions thereof, may be performed by or at a policy engine, EPE 108, PCRF 202, SDN controller 204, and/or another node or module.

Referring to process 700, in step 702, Third Generation Partnership Project (3GPP) session information associated with a user device may be determined using a session identifier. For example, EEP 108 may use a Diameter Gx session identifier to identify PCC rules and/or QoS information associated with UE 102.

In some embodiments, a session identifier may include a Diameter session identifier, an SDN session identifier, an LTE session identifier, an LTE advanced session identifier, an EPS session identifier, an EPS bearer identifier, a Diameter Gx session identifier, or a 3GPP session identifier.

In some embodiments, 3GPP session information may include a session identifier, a QoS parameter value, a QoE parameter value, a bandwidth value, a QCI value, a guarantee bit rate value, a non-guaranteed bit rate value, a priority handling value, a packet delay budget value, or a packet error loss value.

In step 704, SDN policy information for SDN related traffic associated with the 3GPP session may be generated. The SDN policy information may be for providing a QoS for the SDN related traffic corresponding to a QoS associated with the 3GPP session information. The SDN related traffic may be correlated with the 3GPP session using a source address associated with the user device. For example, EPE 108 may generate and provide switching rules to virtual switch 110. In this example, the switching rules may include information for identifying IP flows associated with an SDN session and may provide QoS or policy treatment similar to that provided to related traffic (e.g., corresponding SDFs) in a 3GPP network.

In some embodiments, a source address associated with a user device may be assigned by a PGW, a PCEF, a PDN node, or APN node. For example, UE 102 may be assigned an IP address by PDN 112 during an attach procedure.

In some embodiments, SDN policy information may be sent during a 3GPP attach procedure. For example, after receiving a CCR message from PGW 106, EPE 108 may generate and send corresponding SDN policy information to virtual switch 110.

In some embodiments, a policy engine may include a PCRF and/or an SDN controller. For example, EPE 108 may include PCRF 202 and SDN controller 204.

In some embodiments, a policy engine may be configured to implement an SDN controller for generating or sending the SDN policy information. For example, EPE 108 may implement SDN controller 204 for sending SDN policy information to virtual switch 110.

In some embodiments, a policy engine may be configured to send, via an SDN related interface, the SDN policy information to a virtual switch or an SDN enabled device. For example, SDN policy information may be sent from EPE 108 to virtual switch 110 via an SGi interface or OpenFlow interface.

In some embodiments, an SDN related interface may include an SGi interface, an OpenFlow protocol interface, an NVGRE protocol interface, a VXLAN protocol interface, a ForCES protocol interface, a locator/ID separation protocol (LISP) interface, an OVSDB protocol interface, a border gateway protocol (BGP) interface, a BGP link-state (BGP-LS) protocol interface, a path computation element protocol (PCEP) interface, a network configuration (NETCONF) protocol interface, a simple network management protocol (SNMP) interface, or a Diameter protocol interface.

In some embodiments, SDN policy information may includes information for proportional QoS treatment of SDN related traffic based on the information associated with the 3GPP session. For example, SDN policy information may include information for indicating what percentage of resources each IP flow in a given SDN session is to receive based on an allocation of resources for SDFs or EPS bearers associated with a 3GPP session.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for session based software defined networking (SDN) management, the method comprising:

at a policy engine:
determining, using a session identifier, Third Generation Partnership Project (3GPP) session information associated with a user device and a 3GPP session;
generating, using the 3GPP session information, SDN policy information for SDN related traffic associated with the 3GPP session, wherein the SDN policy information is for providing a quality of service (QoS) for the SDN related traffic corresponding to a QoS associated with the 3GPP session information, wherein the SDN related traffic is correlated with the 3GPP session using a source address associated with the user device, wherein generating the SDN policy information includes grouping Internet protocol (IP) flows with the 3GPP session, and dynamically generating one or more session level switching rules for the IP flows associated with the 3GPP session, wherein the session level switching rules indicate the source address associated with the user device and at least one application identifier for identifying the IP flows associated with the 3GPP session, wherein the SDN policy information is stored by the policy engine in lieu of one or more IP flow switching rules; and sending, via an SDN related interface, the SDN policy information, including the one or more session level switching rules, to a virtual switch located between a packet gateway and a packet data network (PDN) for enforcing QoS for the SDN related traffic traversing the virtual switch, wherein the virtual switch uses the session level switching rules to enforce the QoS for the IP flows associated with the 3GPP session that traverse the virtual switch to the PDN, wherein the session level switching rules include multiprotocol label switching (MPLS) labeling rules for adding MPLS labels to packets of the IP flows associated with the 3GPP session for enforcing the QoS for the IP flows associated with the 3GPP session.

2. The method of claim 1 wherein the 3GPP session information includes the session identifier, a QoS parameter value, a quality of experience (QoE) parameter value, a bandwidth value, a quality class identifier (QCI) value, a guarantee bit rate value, a non-guaranteed bit rate value, a priority handling value, a packet delay budget value, or a packet error loss value.

3. The method of claim 1 wherein the SDN policy information is sent during a 3GPP attach procedure.

4. The method of claim 1 wherein the SDN policy information is generated or sent by an SDN controller implemented in the policy engine.

5. The method of claim 1 wherein the SDN related interface includes an SGi interface, an OpenFlow protocol interface, a network virtualization using generic routing encapsulation (NVGRE) protocol interface, a virtual extensible LAN (VXLAN) protocol interface, a forwarding and control element separation (ForCES) protocol interface, a locator/ID separation protocol (LISP) interface, an open vSwitch database management (OVSDB) protocol interface, a border gateway protocol (BGP) interface, a BGP link-state (BGP-LS) protocol interface, a path computation element protocol (PCEP) interface, a network configuration (NETCONF) protocol interface, a simple network management protocol (SNMP) interface, or a Diameter protocol interface.

6. The method of claim 1 wherein the policy engine includes a policy and charging rules function (PCRF) and/or an SDN controller.

7. The method of claim 1 wherein the SDN policy information includes information for proportional QoS treatment of SDN related traffic based on the information associated with the 3GPP session.

8. The method of claim 1 wherein the session identifier includes a Diameter session identifier, an SDN session identifier, a long term evolution (LTE) session identifier, an LTE advanced session identifier, an evolved packet system (EPS) session identifier, an EPS bearer identifier, a Diameter Gx session identifier, or a 3GPP session identifier.

9. The method of claim 1 wherein the source address associated with the user device is assigned by a packet gateway (PGW), a policy and charging enforcement function (PCEF), a PDN node, or an access point name (APN) node.

10. A system for session based software defined networking (SDN) management, the system comprising:
a policy engine comprising:
at least one processor; and
a memory,
wherein the policy engine is configured to determine, using a session identifier, Third Generation Partnership Project (3GPP) session information associated with a user device and a 3GPP session, to generate, using the 3GPP session information, SDN policy information for SDN related traffic associated with the 3GPP session, wherein the SDN policy information is for providing a quality of service (QoS) for the SDN related traffic corresponding to a QoS associated with the 3GPP session information, wherein the SDN related traffic is correlated with the 3GPP session using a source address associated with the user device, wherein generating the SDN policy information includes grouping Internet protocol (IP) flows with the 3GPP session, and dynamically generating one or more session level switching rules for the IP flows associated with the 3GPP session, wherein the SDN policy information is stored by the policy engine in lieu of one or more IP flow switching rules, wherein the policy engine is configured to send, via an SDN related interface, the SDN policy information, including the one or more session level switching rules, wherein the session level switching rules indicate the source address associated with the user device and at least one application identifier for identifying the IP flows associated with the 3GPP session, to a virtual switch located between a packet gateway and a packet data network (PDN) for enforcing QoS for the SDN related traffic traversing the virtual switch, wherein the virtual switch uses the session level switching rules to enforce the QoS for the IP flows associated with the 3GPP session that traverse the virtual switch to the PDN, wherein the session level switching rules include multiprotocol label switching (MPLS) labeling rules for adding MPLS labels to packets of the IP flows associated with the 3GPP session for enforcing the QoS for the IP flows associated with the 3GPP session.

11. The system of claim 10 wherein the 3GPP session information includes the session identifier, a QoS parameter value, a quality of experience (QoE) parameter value, a bandwidth value, a quality class identifier (QCI) value, a guarantee bit rate value, a non-guaranteed bit rate value, a priority handling value, a packet delay budget value, or a packet error loss value.

12. The system of claim 10 wherein the SDN policy information is sent during a 3GPP attach procedure.

13. The system of claim 10 wherein the policy engine is configured to implement an SDN controller for generating or sending the SDN policy information.

14. The system of claim 10 wherein the SDN related interface includes an SGi interface, an OpenFlow protocol interface, a network virtualization using generic routing encapsulation (NVGRE) protocol interface, a virtual extensible LAN (VXLAN) protocol interface, a forwarding and control element separation (ForCES) protocol interface, a locator/ID separation protocol (LISP) interface, an open vSwitch database management (OVSDB) protocol interface, a border gateway protocol (BGP) interface, a BGP link-state (BGP-LS) protocol interface, a path computation element protocol (PCEP) interface, a network configuration (NETCONF) protocol interface, a simple network management protocol (SNMP) interface, or a Diameter protocol interface.

15. The system of claim 10 wherein the policy engine includes a policy and charging rules function (PCRF) and/or an SDN controller.

16. The system of claim 10 wherein the SDN policy information includes information for proportional QoS treatment of SDN related traffic based on the information associated with the 3GPP session.

17. The system of claim 10 wherein the session identifier includes a Diameter session identifier, an SDN session identifier, a long term evolution (LTE) session identifier, an LTE advanced session identifier, an evolved packet system (EPS) session identifier, an EPS bearer identifier, a Diameter Gx session identifier, or a 3GPP session identifier.

18. The system of claim 10 wherein the source address associated with the user device is assigned by a packet gateway (PGW), a policy and charging enforcement function (PCEF), a PDN node, or an access point name (APN) node.

19. A non-transitory computer readable medium comprising computer executable instructions embodied in the non-transitory computer readable medium that when executed by a processor of a computer control the computer to perform steps comprising:
at a policy engine:
determining, using a session identifier, Third Generation Partnership Project (3GPP) session information associated with a user device and a 3GPP session;
generating, using the 3GPP session information, SDN policy information for software defined networking (SDN) related traffic associated with the 3GPP session, wherein the SDN policy information is for providing a quality of service (QoS) for the SDN related traffic corresponding to a QoS associated with the 3GPP session information, wherein the SDN related traffic is correlated with the 3GPP session using a source address associated with the user device, wherein generating the SDN policy information includes grouping Internet protocol (IP) flows with the 3GPP session, and dynamically generating one or more session level switching rules for the IP flows associated with the 3GPP session, wherein the session level switching rules indicate the source address associated with the user device and at least one application identifier for identifying the IP flows associated with the 3GPP session, wherein the SDN policy information is stored by the policy engine in lieu of one or more IP flow switching rules; and
sending, via an SDN related interface, the SDN policy information, including the one or more session level switching rules, to a virtual switch located between a packet gateway and a packet data network (PDN) for enforcing QoS for the SDN related traffic traversing the virtual switch, wherein the virtual switch uses the session level switching rules to enforce the QoS for the IP flows associated with the 3GPP session that traverse the virtual switch to the PDN, wherein the session level switching rules include multiprotocol label switching (MPLS) labeling rules for adding MPLS labels to packets of the IP flows associated with the 3GPP session for enforcing the QoS for the IP flows associated with the 3GPP session.

* * * * *